United States Patent
Raustia et al.

(10) Patent No.: US 10,433,305 B2
(45) Date of Patent: Oct. 1, 2019

(54) COMMUNICATION METHOD

(71) Applicant: KYYNEL OY, Oulu (FI)

(72) Inventors: Matti Raustia, Oulu (FI); Teemu Vanninen, Oulu (FI)

(73) Assignee: KYYNEL OY, Oulu (FI)

( * ) Notice: Subject to any disclaimer, the term of this patent is extended or adjusted under 35 U.S.C. 154(b) by 0 days.

(21) Appl. No.: 15/260,033

(22) Filed: Sep. 8, 2016

(65) Prior Publication Data

US 2017/0079041 A1 Mar. 16, 2017

(30) Foreign Application Priority Data

Sep. 10, 2015 (EP) .................................. 15184607

(51) Int. Cl.
*H04W 24/00* (2009.01)
*H04W 72/04* (2009.01)
*H04L 5/00* (2006.01)
*H04L 5/06* (2006.01)
(Continued)

(52) U.S. Cl.
CPC ....... *H04W 72/0453* (2013.01); *H04L 5/0005* (2013.01); *H04L 5/0044* (2013.01); *H04L 5/06* (2013.01); *H04L 5/0037* (2013.01); *H04L 5/143* (2013.01); *H04W 88/02* (2013.01)

(58) Field of Classification Search
CPC . H04W 72/0453; H04W 72/04; H04W 72/02; H04W 72/0406; H04W 88/02; H04W 28/26; H04W 16/14; H04W 24/00; H04L 5/0005; H04L 5/0037; H04L 5/0044; H04L 5/0048; H04L 5/0007; H04L 5/0064; H04L 5/0094; H04L 5/0055; H04L 5/006; H04L 5/003; H04L 5/0098; H04L 25/03159; H04L 25/03343; H04L 25/03821; H04L 27/2626; H04L 27/2657; H04L 27/0006; H04L 29/06; H04L 47/14;
(Continued)

(56) References Cited

U.S. PATENT DOCUMENTS 8,861,661 B2 * 10/2014 Fujimura ........... H04B 7/15542
375/349
2005/0143081 A1 6/2005 Stephens
(Continued)

FOREIGN PATENT DOCUMENTS

EP 1 976 317 A1 10/2008
WO 00/28694 5/2000
WO 2012/172162 A1 12/2012

OTHER PUBLICATIONS

European Search Report, Application No. EP 15 18 4607, 2 pages, dated Jan. 4, 2016.

*Primary Examiner* — Un C Cho
*Assistant Examiner* — Rasha K Fayed
(74) *Attorney, Agent, or Firm* — FisherBroyles.com

(57) ABSTRACT

A solution for operating a radio communication apparatus communicating with at least one other apparatus is provided. In communication, a frequency block of a set of frequency blocks having a given center frequency is utilized. The center frequencies of at least some adjacent frequency blocks are separated by a given frequency offset. The offset is selected such that the adjacent frequency blocks are partly overlapping and the apparatus receiving a given frequency interprets a signal separated from the given signal by the offset as noise.

7 Claims, 3 Drawing Sheets

300: UTILIZE FREQUENCY BLOCK IN TRANSMISSION

302: SELECT FREQUENCY OFFSET

(51) Int. Cl.
*H04W 88/02* (2009.01)
*H04L 5/14* (2006.01)

(58) Field of Classification Search
CPC ....... H04L 47/15; H04L 47/72; H04L 47/824; H04L 47/70
USPC .................. 370/329; 375/260; 455/451, 453
See application file for complete search history.

(56) References Cited

U.S. PATENT DOCUMENTS

| | | | | |
|---|---|---|---|---|
| 2005/0174966 A1* | 8/2005 | Lansford | ................ | H04L 5/023 370/329 |
| 2007/0002797 A1* | 1/2007 | Lai | ................ | H04W 36/06 370/331 |
| 2008/0153447 A1* | 6/2008 | Cowley | ................ | H03G 3/3052 455/296 |
| 2008/0273606 A1* | 11/2008 | Orfanos | ................ | H04L 5/003 375/260 |
| 2008/0279292 A1* | 11/2008 | Tanabe | ................ | H04L 5/0051 375/260 |
| 2009/0202010 A1* | 8/2009 | Fu | ................ | H04L 25/03159 375/260 |
| 2010/0002675 A1* | 1/2010 | Fu | ................ | H04L 5/0007 370/343 |
| 2010/0114243 A1* | 5/2010 | Nowak | ................ | A61N 1/08 607/60 |
| 2010/0208717 A1* | 8/2010 | Kim | ................ | H04W 16/14 370/342 |
| 2010/0210228 A1* | 8/2010 | Ishida | ................ | H04H 20/30 455/179.1 |
| 2013/0221867 A1* | 8/2013 | Deppe | ................ | H05B 33/0809 315/224 |
| 2013/0273926 A1* | 10/2013 | Peng | ................ | H04B 7/15528 455/450 |
| 2015/0319027 A1* | 11/2015 | Tang | ................ | H04L 27/2675 375/316 |

* cited by examiner

COMMUNICATION METHOD

CROSS-REFERENCE TO RELATED APPLICATION

This application claims benefit to European Application No. 15184607.8, filed Sep. 10, 2015, which is incorporated by reference herein in its entirety.

BACKGROUND

Field

The invention relates to the field of radio communications.

Description of the Related Art

Modern radio communication systems support operation on a frequency channel selected from a plurality of frequency channels according to a determined criterion. Some systems rely on frequency planning where a given frequency band is assigned to the system, and the system is configured to operate exclusively on that frequency band. Such systems are typically based on using licensed frequency bands. Other systems are configured to choose a frequency to be used more adaptively, e.g. on the basis of scanning for the available (non-occupied) frequencies and, then, transferring control messages related to negotiation of the frequency band to be used. Such methods increase signaling overhead, particularly in networks comprising numerous network nodes.

Frequency spectrum is a limited resource. Different forms of radio communication have increased continuously and efficient use of spectrum is a key issue in the development of communication networks.

SUMMARY

According to an aspect of the present invention, there is provided a method for operating a radio communication apparatus communicating with at least one other apparatus, the method comprising: utilizing in communication a frequency block of a set of frequency blocks having a given center frequency, the center frequencies of at least some adjacent frequency blocks being separated by a given frequency offset, and selecting the offset such that the adjacent frequency blocks are partly overlapping and the apparatus receiving a given frequency interprets a signal separated from the given signal by the offset as noise.

According to another aspect of the present invention, there is provided an apparatus, comprising radio interface parts and a communication controller controlling the radio interface parts to utilize in communication a frequency block of a set of frequency blocks having a given center frequency, the center frequencies of at least some adjacent frequency blocks being separated by a given frequency offset, and selecting the offset such that the adjacent frequency blocks are partly overlapping and the apparatus receiving a given frequency interprets a signal separated from the given signal by the offset as noise.

According to yet another aspect of the present invention, there is provided a computer program product embodied on a computer readable distribution medium and comprising program instructions which, when loaded into an apparatus, execute the method comprising steps of utilizing in communication a frequency block of a set of frequency blocks having a given center frequency, the center frequencies of at least some adjacent frequency blocks being separated by a given frequency offset, and selecting the offset such that the adjacent frequency blocks are partly overlapping and the apparatus receiving a given frequency interprets a signal separated from the given signal by the offset as noise.

Some embodiments of the invention are defined in the dependent claims.

BRIEF DESCRIPTION OF THE DRAWINGS

In the following the invention will be described in greater detail by means of preferred embodiments with reference to the attached [accompanying] drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
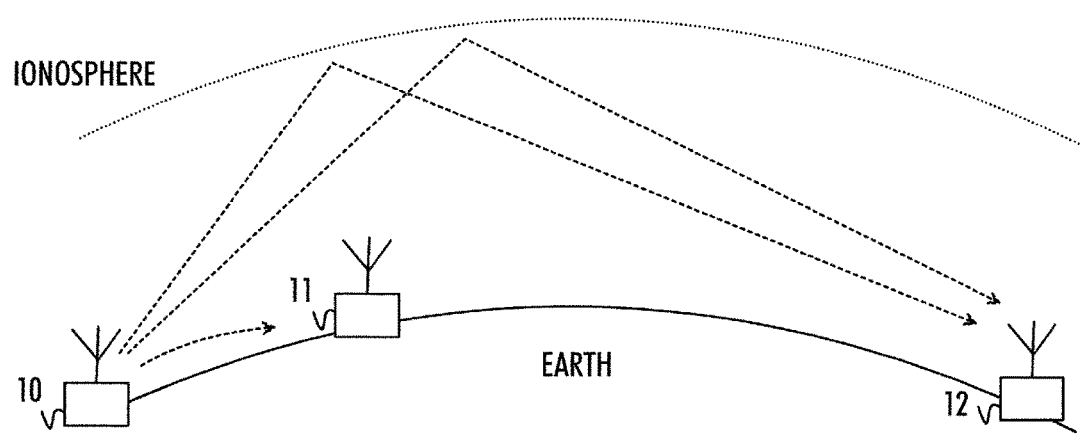
FIG. 1 illustrates communication between radio communication apparatuses in a radio communication system.

FIG. 1 illustrates an example of a wireless telecommunication system to which embodiments of the invention may be applied. Embodiments of the invention may be realized in an ad hoc network comprising a plurality of network nodes 10, 11, 12 that may be realized by radio communication apparatuses. The ad hoc network may refer to a network that is established between the network nodes 10 to 12 without any network planning with respect to the infrastructure and/or frequency utilization. The network nodes may be operationally equivalent to each other. At least some of the network nodes 10 to 12 are free to move, and they may also be configured to route data packets that are unrelated to their own use, e.g. data packets of other network nodes. However, it should be understood that principles of the invention may be applied to other types of communication systems, e.g. wireless mesh networks, communication systems having a fixed infrastructure such as cellular communication systems, and other types of systems. The principles of the invention may also be applied to point-to-point connections, wherein two network nodes communication directly with each other without using any other network node to route the data packets.

In the embodiment of FIG. 1, the network nodes 10 to 12 have a very long communication range (even thousands of kilometers), and they may communicate directly with network nodes on the other side of the Earth. Their transmit powers may vary from a few Watts (e.g. 20 to 50 W) to even kilo Watts, depending on whether the network node is mobile or fixed and the type of power supply. For example, a network node installed to a building, a truck, or a ship may utilize high transmit powers, while a hand-held device may be limited to a few Watts. The frequency band utilized by the network nodes 10 to 12 may comprise a high frequency (HF) band (3 to 30 MHz), but it should be understood that other embodiments utilize other frequency bands, e.g. very high frequencies (VHF) or ultra-high frequencies (UHF). An advantage of HF frequencies is their long propagation range, and the fact that they may propagate via several types of communication paths. FIG. 1 illustrates a scenario where a first network node 10 communicates with a second network node 11 over surface radio waves that propagate close to the ground surface. However, a third network node 12 on the other side of the Earth may be reached via radio waves that propagate by utilizing ionospheric reflections. Some network nodes may be reached by using both surface waves and ionospheric reflections, and some embodiments of the invention are configured to utilize this property.

The network nodes 10 to 12 are configured to support communication on a high frequency band from which actual transmission frequencies may be selected according to embodiments described herein. The supported frequency band may be continuous or divided into a plurality of frequency bands separated from each other. The division may be based on the fact that there are other systems occupying some frequencies that may have a priority to occupy the frequencies, while the present system has to adapt to the frequency occupation of such a primary system. In some embodiments, the systems occupying the same frequency band have equal priority to the frequency occupation, and at least the present system may utilize cognitive channel selection procedures described herein to avoid collisions between the systems.

Figure 2A:
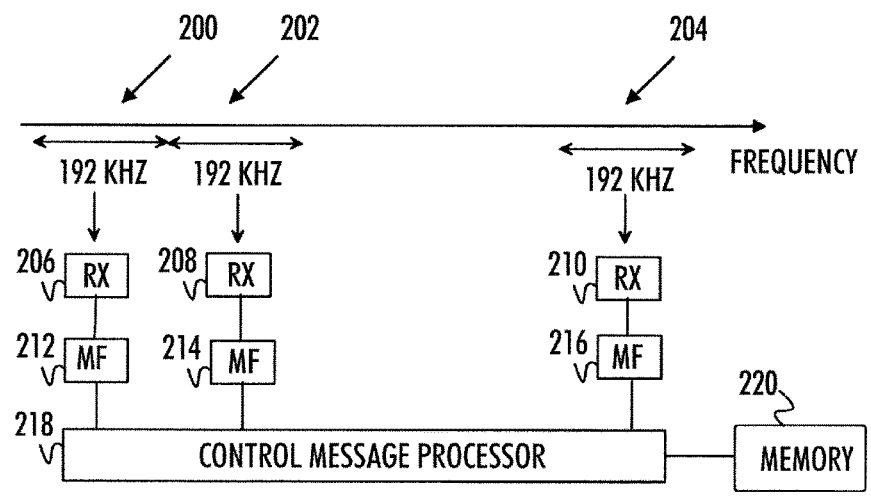
FIG. 2A illustrates an embodiment of a receiver.
Figure 2B:
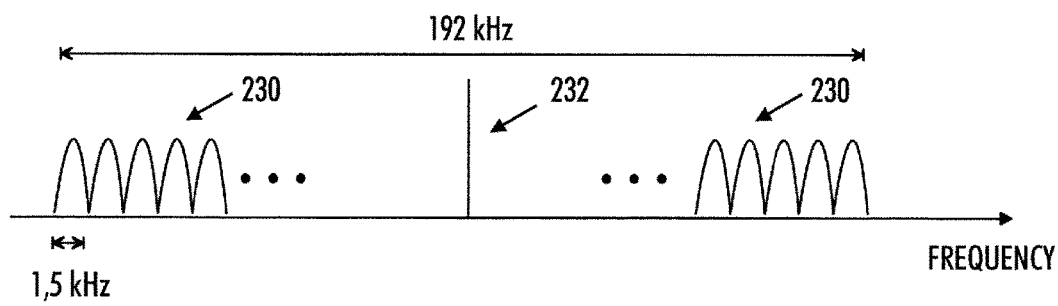
FIGS. 2B and 2C illustrate examples of frequency utilization.

Let us consider the frequency utilization and the operation of the radio communication apparatus in greater detail with reference to FIGS. 2A and 2B. FIG. 2A illustrates an embodiment where the operational band of the whole system is divided into a plurality of frequency blocks 200, 202, 204. In this example, each frequency block has the bandwidth of 192 kHz. Also other bandwidths are possible. The radio communication apparatus is tuned to receive 192 kHz signals of each frequency block. The radio communication apparatus may comprise a plurality of radio receivers 206, 208, 210, wherein each radio receiver 206 to 210 is tuned to receive radio signals on at least one frequency block. In some embodiments where the number of frequency blocks supported by the system is higher than the number of radio receivers 206 to 210, at least some of the radio receivers 206 to 210 are tuned to receive a plurality of frequency blocks. The radio receivers 206 to 210 may then carry out frequency-hopping between said plurality of frequency blocks.

Referring to the example of FIG. 2B, the bandwidth of the actual transmissions is 1.5 kHz in this embodiment. Each 192 kHz frequency block may be divided to 1.5 kHz (another bandwidth in other embodiments) sub-bands 230. In some embodiments, the number of sub-bands 230 in the frequency blocks is the bandwidth of the frequency block divided by the bandwidth of the sub-band, e.g. 192 kHz/1.5 kHz=128. In such embodiments, the separation between centre frequencies of adjacent sub-bands 230 is equal to the bandwidth of the sub-bands, e.g. 1.5 kHz. In an embodiment, the sub-bands may overlap in the frequency domain, but sufficient frequency separation may still be achieved so that adjacent channel interference may be mitigated in the receiver. For example, the centre frequency separation may be 1 kHz or even 500 Hz, while the bandwidth of the sub-band is several kHz. In other embodiments, a guard band is provided between adjacent sub-bands. The transmitter may be configured to select one or more sub-bands per frequency block to carry out the transmission. If a frequency block does not contain an unoccupied sub-band, the frequency block may be bypassed in the selection of the sub-band. As a consequence, the number of sub-bands used in the transmission may be equal to the number of frequency blocks supported by the system. However, as mentioned above, the number of sub-bands used in the transmission may be other than the number of frequency blocks, when zero to more than one sub-band may be selected per frequency block. The sub-bands used in the transmission are typically non-consecutive except for in special cases, e.g. when the highest sub-band of a first frequency block and the lowest sub band of a neighbouring frequency block on a higher frequency are selected for the transmission.

In an embodiment, the radio communication apparatuses utilize an OFDM (Orthogonal Frequency Division Multiplexing) or, in general, a multicarrier structure designed for transmission of multicarrier signals, that is, signals having symbols on a plurality of parallel orthogonal sub-carriers. As the symbols are separated in frequency, an OFDM receiver is typically configured to process received signals in a frequency domain. The OFDM receiver may be tuned to receive a frequency block (192 kHz), and it may be configured to consider each (1.5 kHz) sub-band as a "sub-carrier". As a consequence, a single-carrier control message is received with a multi-carrier receiver. As the OFDM receiver processes the received signal in the frequency domain, the radio receiver 206 to 210 may comprise a Fourier transform circuitry configured to convert the received signal into a frequency domain representation. Thereafter, matched filters 212 to 216 matched to the waveform of a frequency-domain representation of a pilot sequence of the received signal process each sub-band. In the frequency domain, the matched filtering procedure comprises a simple multiplication between the received signal and the pilot sequence, thereby providing computationally less complex correlation than with a convolution used in the time-domain correlation.

As known in the art, the matched filters 212 to 216 may be replaced by a correlator structure.

The example of FIG. 2B illustrates the centre frequency 232 of the 192 kHz frequency block. In the example of FIG. 2A, the frequency blocks used in communication are not overlaying but are situated either side by side in the available spectrum or separate from each other. In an embodiment, frequency blocks may be partly overlapping. ODFM receivers are sensitive to frequency errors. The sensitivity depends on the OFDM bandwidth. For example, with 192 kHz bandwidth a frequency error of a few ten Hz may cause the receiver to interpret transmission as noise. This feature may be turned into advantage by utilising a small frequency offset in the selection of centre frequencies for frequency blocks.

Figure 3:
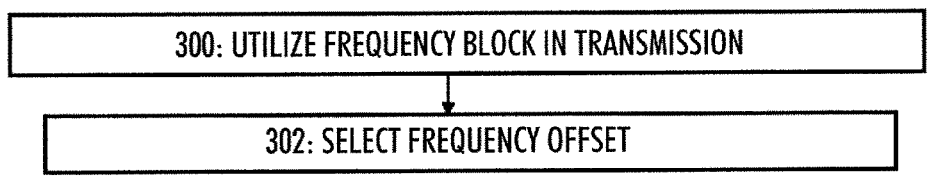
FIG. 3 is a flow chart illustrating an example.

FIG. 3 is a flowchart illustrating an embodiment. The example illustrates a method for operating a radio communication apparatus communicating with at least one respective apparatus.

In step 300, a frequency block of a set of frequency blocks having a given centre frequency is utilized in communication. Each frequency block may comprise a predetermined number of sub bands. The centre frequencies of at least some adjacent frequency blocks are separated by a given frequency offset.

In step 302, the frequency offset is selected such that the adjacent frequency blocks are partly overlapping and the apparatus receiving a given frequency interprets a signal separated from the given signal by the offset as noise.

Thus, a given frequency block having a given centre frequency is utilised in transmission. An adjacent frequency block is separated from the given frequency block by a frequency offset but the receiver interprets transmission using the adjacent frequency block as noise. A non-limiting numerical example of a possible value of the frequency offset is between 30 to 60 Hz. In an embodiment, the value of the frequency offset may depend partly on the size of the frequency block. In an embodiment, the given frequency offset is smaller than the bandwidth of a sub band.

Figure 2C:
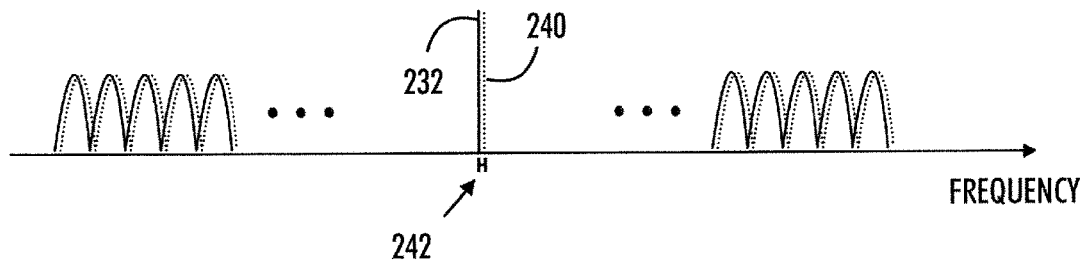

FIG. 2C illustrates the example embodiment further. A given frequency block of exemplary size 192 kHz has a centre frequency 232 with 128 sub bands each having the bandwidth of 1.5 kHz. An adjacent frequency block is situated partly overlapping with the given frequency block and is separated by a frequency offset 242 of 30 Hz. Thus, the centre frequency 240 and each sub band of the adjacent frequency block is shifted from the centre frequency 240 and each sub band of the given frequency block by the frequency offset, in this example 30 Hz.

In the example of FIG. 2C the adjacent frequency block is on the right side of the given frequency block. Naturally there may be an adjacent frequency block is on the left side of the given frequency block as well. Further, there may be other frequency blocks partly over lapping with the other frequency blocks, where the centre frequency of each frequency block is separated from the adjacent frequency block by the frequency offset.

In this manner, the available frequency spectrum may be more effectively utilised than before.

Figure 4:
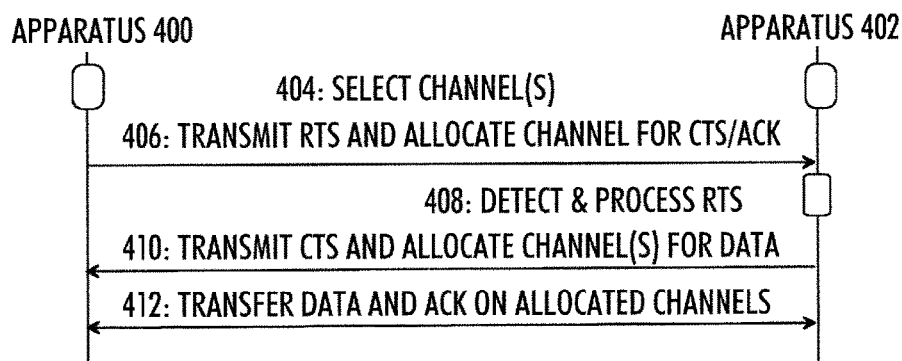
FIG. 4 illustrates a signalling diagram of a data transfer negotiation process.

Let us now consider the data transmission in a network comprising several network nodes or apparatuses, according to an embodiment of the invention with reference to FIG. 4. The communication is between a first apparatus 400 and a second apparatus 402. In an embodiment, apparatuses of the network are aware of the frequency block(s) monitored by the different apparatuses.

In step 404, the first apparatus selects a channel to transmit a Request to Send message to the apparatus 402. The process of selection is otherwise outside the scope of the present application, except that the apparatus is aware of the centre frequency or frequencies of the frequency block(s) monitored by the apparatus 402. Thus, the frequency offsets used by the apparatus 402 are known to the apparatus 400. In 406, the apparatus 400 determines to carry out a data transmission. Parameters of the data transmission may be negotiated through a negotiation phase in which the apparatus 400 transmits a transmission request message (e.g. a request-to-send, RTS) to the apparatus 402, which is configured to respond with a transmission response message (e.g. a clear-to-send, CTS). In 406, the first apparatus 400 transmits the RTS message to the apparatus 402. The RTS message may be transmitted on a plurality of channels, e.g. on a sub-band of every frequency block for which the apparatus 400 has selected a sub-band.

Figure 5:
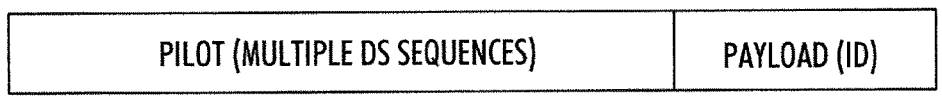
FIGS. 5 and 6 illustrate formats of a transmission request message and a transmission response message.

FIG. 5 illustrates an embodiment of the RTS message. The RTS message may comprise a pilot sequence as a header. As the payload portion, the RTS message may comprise the identifier of the first apparatus and the identifier of the recipient of the RTS message, which both may be unique for each network node or apparatus of the network. The RTS message may also comprise an information element used to specify how much data the first apparatus needs to transmit. This information element may be used to define a quality-of-service (QoS) classification of the data being transmitted. The QoS classification may specify real-time requirements for the data, and typical QoS classifications may include conversational and streaming as real-time classes and interactive and background as non-real time classes. Other QoS classes are equally applicable. The RTS message may further comprise a field specifying at least one channel to be used as a feedback channel for at least the CTS message but, optionally, also for the data transmission. This field may be used by the first apparatus to specify at least one (but in some embodiments a plurality, e.g. four) feedback channel on which the CTS message is to be transmitted. Furthermore, the feedback channel(s) may be used to convey positive/negative acknowledgment messages (ACK/NACK) indicating successful/erroneous data reception, respectively.

Upon reception of the RTS message in 406, the second apparatus 402 detects the RTS message in 408 on the basis of the matched filtering the pilot sequence. Furthermore, the second apparatus 402 may detect from the structure or from a specific identifier contained in the message that the message is the RTS message. Upon determining that the message is the RTS message, the second apparatus 402 extracts the payload portion of the RTS message and processes the transmission request. The extraction may again comprise equalization based on using the pilot header as the training sequence, and also synchronization with symbol timing of the RTS message may be carried out on the basis of the pilot header.

In 408, the second apparatus 402 detects the QoS classification of the request (or another indicator specifying the amount of transmission resources needed), determines the number of sub bands needed to comply with the request, and selects the sub bands. The selection of the sub bands may be based on selecting the necessary number of sub bands that are determined to provide the highest channel quality for the first apparatus or for the first and second apparatus. Again, one sub band per frequency block may be selected for the data transfer, but in other embodiments multiple sub bands per frequency block may be selected. Additionally, the second apparatus 402 may determine a modulation and coding scheme that provides a data rate that complies with the QoS class specified in the RTS message. The second apparatus 402 may determine the modulation and coding scheme (and other transmission parameters) also (or alternatively) on the basis of the channel state of the selected sub band(s). In order to reduce the complexity of the second apparatus 402, the second apparatus 402 may be configured to support a limited number of modulation and coding schemes.

Figure 6:
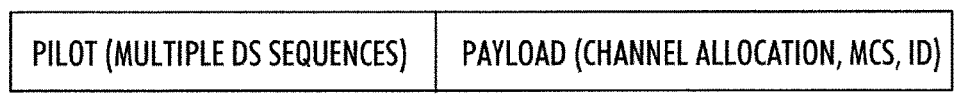

In 410, the second apparatus 402 prepares the CTS message for transmission to the first apparatus 400. FIG. 6 illustrates an embodiment of the format of the CTS message. The CTS message may comprise a pilot header, but the number of concatenated pilot sequences contained in the pilot header may be different than in the RTS message. As the first apparatus has already specified the sub band(s) for the CTS message, it is configured to monitor for those sub bands for the CTS message. Therefore, a shorter pilot header may be used in the CTS message. The payload part of the CTS message may comprise the identifier of the second apparatus (the transmitter of the CTS message), the channel allocation for the data transmission comprising the selected sub bands, and the selected modulation and coding scheme. The channels may be identified by using channel indexes, wherein each sub band has a unique channel index. Similarly, the modulation and coding schemes may be indexed, and the appropriate index may be specified in the CTS message. In 410, the second apparatus transmits the CTS message to the first apparatus on the channel(s) specified in the RTS message.

It should be noted that the channel allocation specified in the CTS message may specify at least some different channels than those specified in the RTS message for the transmission of the CTS message and the ACK/NAKs. The first apparatus receives the CTS message in 410. The first apparatus uses the pilot header for timing synchronization and/or for the equalization of the CTS message, and extracts the payload part of the CTS message. Then, the first apparatus configures its transmitter parts for transmission with the parameters specified in the CTS message.

In 412, the first apparatus carries out the data transmission on the sub band(s) allocated in the CTS message by using the modulation and coding scheme specified in the CTS message. The second apparatus is configured to monitor for those sub bands. Upon reception of the data transfer on those channels, the second apparatus processes the received data by carrying out data detection and decoding algorithms. Upon successful reception of the data, the receiver is configured to transmit an ACK message on the sub band(s) specified in the RTS message. However, upon erroneous reception of the data, the second apparatus may be configured to transmit a NAK message on the sub band(s) specified in the RTS message. In some embodiments, the second apparatus may respond only to the correct reception (ACK) or to the erroneous reception (NAK) of the data. For example, when the second apparatus acknowledges only the correct receptions by transmitting ACK, the first apparatus detects erroneous reception upon detection of no ACK message for a given data packet. Any hybrid automatic repeat request (HARQ) procedures are also possible, wherein upon detecting erroneous reception of a data packet, a retransmission comprises either the same data packet (chase combining) or additional information (e.g. parity bits) that help the decoding in the second apparatus. The latter embodiment is known as incremental redundancy HARQ.

In this manner, the data transfer continues between the network nodes. Thus, the RTS message is sent using sub band(s) of given frequency block(s) having a given frequency offset. The CTS message is sent using sub band(s) of frequency block(s) indicated by the first apparatus in the RTS message. These sub band(s) of frequency block(s) may be selected by the first apparatus on the basis of scanning in such a manner that they seem to be interference free from the point of view of the first transmitter. The frequency block may be different than the one used when sending the RTS message.

Thus, in an embodiment, the frequency block having the given center frequency is utilized in the transmission of a request to send message. The rest of the communication may utilize different frequency blocks.

In an embodiment, different transmission directions utilize frequency blocks separated by the frequency offset. This embodiment may be relevant especially when the network structure comprises a base station or hub type of apparatus with which other apparatuses of the network communicate. In this example, an RTS sent by a node is not detected by other nodes. Again, different frequency blocks may be used in the transmission of RTS messages and the actual data traffic.

In an embodiment, the apparatuses of a network are divided into sub networks or groups, and different sub networks or groups utilize different frequency blocks which may be at least partially overlapping but separated by a frequency offset. Thus, an apparatus of a sub network or a group does not detect the communications of another sub network or group. In an embodiment, the transmitting apparatus of a group transmits a narrowband signal utilising a given frequency offset. The receiving apparatus of the same group, which receiver is operating in OFDM principle, detects the narrow band signal. Apparatuses of different groups and tuned to different frequency offset do not detect the transmission at all.

An apparatus may be a member of more than one group or sub network. For example, assume that nodes 1, 2 and 3 form a group normally utilising a 0-frequency offset and nodes 4, 5 and 6 form another group normally utilising a 30 Hz frequency offset. If node 0 needs to communicate with node 4, it may be configured to transmit an RTS using 30 Hz frequency offset. Rest of the communication may utilise sub band and frequency offset negotiated by the nodes. After communication node 0 returns to 0 frequency offset.

The nodes or apparatuses of the network may be equipped with link layer and/or network layer intelligence. As each sub band or channel may be utilized by a plurality of network nodes, each network node may be equipped with Medium Access Control (MAC) logic realizing, for example, a carrier sense multiple access (CSMA) procedure in which the network node senses the sub bands it intends to in the transmission prior to carrying out the transmission on those sub bands. If the sub band is detected to be free, the network node proceeds to transmission. On the other hand, if the sub band is detected to contain interference (e.g. another user/system), the network node may tune to another sub band and carry out the CSMA on that channel. The channels sensed in the CSMA process may be the channels allocated to be preferred by the network nodes carrying out the data transfer over a radio link. The network node may also employ collision detection and/or collision avoidance procedures to avoid collisions. This may be applied to the transmission of the RTS message, the CTS message and/or the data. The channel selection procedure in the RTS/CTS handshake is another example of the MAC procedures implemented in the network. With respect to the network layer, as each network node or apparatus 10 to 12 may store a list of other network nodes or apparatuses with which it is able to communicate, the network nodes may be configured to exchange routing messages. A routing message may comprise a list of network nodes a given network node 10 to 12 is able to reach, either directly or indirectly. This enables the other nodes to construct a routing table comprising a list of nodes that may be reached through a given neighbour node. The routing tables may be used to determine routes in the ad hoc network, e.g. by determining through which node a given destination node may be reached. Thus, the routing tables may be used in transmitting and forwarding the data packets. The routing tables may be seen as higher layer signalling, and the routing tables may be transmitted as data in the physical layer. As a consequence, the transmission of the routing table may be carried out through the RTS/CTS handshake procedure.

Figure 7:
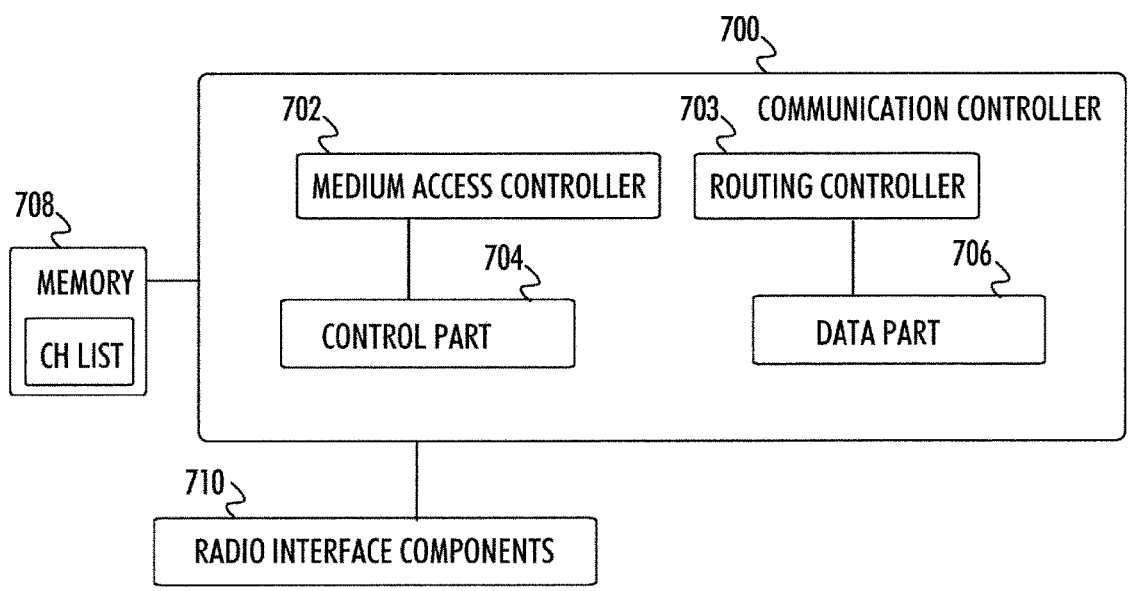
FIG. 7 is a block diagram of an apparatus according to an embodiment.

FIG. 7 illustrates an embodiment of an apparatus comprising means for carrying out the functionalities of the network node according to any one of the above-described embodiments. The apparatus may be a radio communication apparatus implemented as a portable device, e.g. a computer (PC), a laptop, a tabloid computer, a portable radio phone, a mobile radio platform (installed to a vehicle such as a truck or a ship), or any other apparatus provided with radio communication capability. In some embodiments, the apparatus is the vehicle equipped with the radio communication capability. In other embodiments, the apparatus is a fixed station, e.g. a base station. In further embodiments, the apparatus is comprised in any one of the above-mentioned apparatuses, e.g. the apparatus may comprise a circuitry, e.g. a chip, a processor, a micro controller, or a combination of such circuitries in the apparatus.

The apparatus may comprise a communication controller circuitry 700 configured to control the communications in the communication apparatus. The communication controller circuitry 700 may comprise a control part 704 handling control signalling communication with respect to establishment, operation, and termination of the radio connections. The control part 704 may also carry out any other control functionalities related to the operation of the radio links, e.g. transmission, reception, and extraction of the control messages and the RTS/CTS messages. The communication controller circuitry 700 may further comprise a data part 706 that handles transmission and reception of payload data over the radio links. The communication controller circuitry 700 may further comprise a medium access controller circuitry 702 configured to carry out channel selection procedures. For example, the medium access controller circuitry 702 may determine the sub bands to be used in the data transfer on the basis of sub band preferences. The medium access controller circuitry 702 may also determine the contents for the RTS/CTS messages, e.g. the channel selection, the QoS classification (may be received from higher layers), the modulation and coding scheme, etc. The communication controller circuitry 700 may further comprise a routing controller circuitry 703 configured to carry out network layer procedures. The routing controller may control the data part 706 with respect to the transmission of the data. The routing controller circuitry 703 may construct routing tables on the basis of routing messages received from the neighbour nodes and/or other messages the apparatus detects (e.g. RTS/CTS messages). As a consequence, the routing controller circuitry 703 is configured to control the data part 706 to transmit a given data packet to an appropriate neighbour node.

The circuitries 702 to 706 of the communication controller circuitry 700 may be carried out by the one or more physical circuitries or processors. In practice, the different circuitries may be realized by different computer program modules. Depending on the specifications and the design of the apparatus, the apparatus may comprise some of the circuitries 700 to 706 or all of them.

The apparatus may further comprise the memory 708 that stores computer programs (software) configuring the apparatus to perform the above-described functionalities of the network node. The memory 708 may also store communication parameters and other information needed for the radio communications. For example, the memory may store the routing tables. The memory 708 may serve as the buffer for data packets to be transmitted. The apparatus may further comprise radio interface components 710 providing the apparatus with radio communication capabilities with other network nodes. The radio interface components 710 may comprise standard well-known components such as amplifier, filter, frequency-converter, analog-to-digital (A/D) and digital-to-analog (D/A) converters, (de)modulator, and encoder/decoder circuitries and one or more antennas. In particular, the radio interface components 710 may realize the above-mentioned radio receivers 206 to 210, while the matched filter and other signal processing may be carried out by any one of the radio interface components 710, the control part 704, and the data part 706, according to the design of the apparatus. The apparatus may further comprise a user interface enabling interaction with the user. The user interface may comprise a display, a keypad or a keyboard, a loudspeaker, a smartcard and/or fingerprint reader, etc.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory (ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of any one of the processes described above intonation with of FIGS. 1 to 7. Accordingly, the at least one processor, the memory, and the computer program code form processing means for carrying out embodiments of the present invention in the communication apparatus.

In an embodiment, the at least one memory and the computer program code are configured, with the at least one processor, to cause the apparatus to operate a radio communication apparatus communicating with at least one respective apparatus by utilizing in OFDM based transmission a frequency block of a set of frequency blocks having a given center frequency, the center frequencies of at least some adjacent frequency blocks being separated by a given frequency offset and selecting the offset such that the adjacent frequency blocks are partly overlapping and the apparatus receiving a given frequency interprets a signal separated from the given signal by the offset as noise.

The processes or methods described in connection with FIGS. 1 to 7 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to radio telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

What is claimed is:

1. A method for operating a radio communication apparatus communicating with at least one other apparatus, the method comprising:

utilizing a first frequency block of a set of frequency blocks, wherein each frequency block comprises a center frequency and a predetermined number of sub bands used in communication; and based on the at least one other apparatus interpreting a signal from a first of the sub bands of the first frequency block as noise, selecting a frequency offset of the first frequency block, wherein all of the sub bands of the at least-one adjacent frequency block partly overlap all of the sub bands of the first frequency block, and the frequency offset is smaller than a bandwidth of the first sub band, wherein the center frequency of at least one adjacent frequency block is separated from the center frequency of the first frequency block by the frequency offset, and wherein the frequency offset is between 30 to 60 Hz.

2. The method of claim 1, wherein the frequency offset is selected at least partly on the basis of the bandwidth of the first frequency block.

3. The method of claim 1, wherein the first frequency block having the center frequency is utilized in the transmission of a request to send message.

4. The method of claim 1, wherein different transmission directions utilize frequency blocks separated by the frequency offset.

5. The method of claim 1, apparatus and located within the same radio coverage area utilize different frequency blocks of the set of frequency blocks.

6. An apparatus, comprising:
radio interface parts; and
a communication controller that:

controls the radio interface parts to utilize a first frequency block of a set of frequency blocks, wherein each frequency block comprises a center frequency and a predetermined number of sub bands used in communication; and based on at least one other apparatus interpreting a signal from a first of the sub bands of the first frequency block as noise, selects a frequency offset of the first frequency block, wherein all sub bands of the at least one adjacent frequency block partly overlap all of the sub bands of the first frequency block, and the frequency offset is smaller than a bandwidth of the first sub band, wherein the center frequency of at least one adjacent frequency block is separated from the center frequency of the first frequency block by the frequency offset, and wherein the frequency offset is between 30 to 60 Hz.

7. A computer program product embodied on a non-transitory distribution medium readable by a computer and comprising program instructions which, when executed by an apparatus, perform a method comprising:

utilizing a first frequency block of a set of frequency blocks, wherein each frequency block comprises a center frequency and a predetermined number of sub bands used in communication; and based on the at least one other apparatus interpreting a signal from a first of the sub bands of the first frequency block as noise, selecting a frequency offset of the first frequency block, wherein all of the sub bands of the at least one adjacent frequency block partly overlap all of the sub bands of the first frequency block, and the frequency offset is smaller than a bandwidth of the first sub band, wherein the center frequency of at least one adjacent frequency block is separated from the center frequency of the first frequency block by the frequency offset, and wherein the frequency offset is between 30 to 60 Hz.

* * * * *